June 10, 1952  E. S. EWART  2,600,231
PNEUMATIC TIRE CASING
Filed Aug. 22, 1947
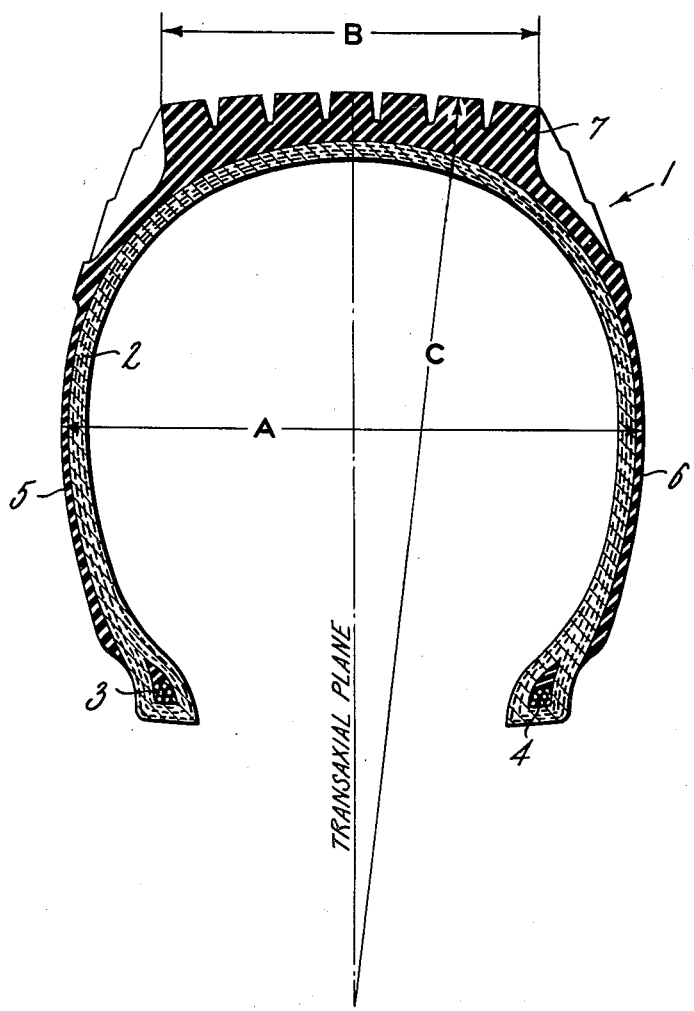
INVENTOR.
ELLIOTT S. EWART
BY Henry P. Truesdell
ATTORNEY Patented June 10, 1952

2,600,231

UNITED STATES PATENT OFFICE 2,600,231

PNEUMATIC TIRE CASING

Elliott S. Ewart, St. Clair Shores, Mich., assignor to United States Rubber Company, New York, N. Y., a corporation of New Jersey Application August 22, 1947, Serial No. 770,056

1 Claim. (Cl. 152—352)

My invention relates to a pneumatic tire casing and more particularly to a pneumatic tire casing having certain proportions between the volume of the inflated casing, the cross-sectional width of the casing, the width of the tread as measured from shoulder to shoulder and the tread profile.

An object of my invention is to provide a new and improved pneumatic tire casing having greatly improved riding qualities in that the ride is softer while, at the same time, the tire is exceptionally stable on turns.

Another object of my invention is the provision of an improved tire casing so constructed as to run cooler and give increased mileage.

Still another object of my invention is to provide an improved tire casing having the desirable characteristics mentioned and which can be used interchangeably with tires now in use by mounting on standard size rims.

The accompanying drawing illustrates a tire casing constructed in accordance with my invention and which is characterized by having certain relative proportions to be hereinafter described.

In the design of tire casings, it is well known in the art that variations in the dimensions and arrangement of the casing components may be made to achieve certain results. For example, tires having various tread widths and different tread profiles have been heretofore manufactured in an effort to secure increased wear. Moreover, tires of large cross sections, such as the well-known "balloon" tire, have been utilized in an effort to obtain easier riding qualities. In such instances, however, other factors have been sacrificed such as stability of the tire on turns, easier steering and the resistance of the tire to heat build-up with consequent reduced wear. The result has been that through many years of actual experience tire design for any given size wheel has become more or less standardized as to dimensions and profile. Such composite dimensions gathered from the experience of a host of manufacturers have been correlated and published by the Tire & Rim Association as design data for tires of various sizes. In this way, interchangeability of parts has been achieved, both as to tire sizes and rim sizes, with a consequent benefit to the public in that the product of one manufacturer may be replaced with that of another. This does not mean that manufacturers are in any way bound to adhere to the published design data; rather, they are free to depart therefrom whenever they choose to do so in the interest of obtaining a better product or lower costs, or both. As a consequence, tires on the market today vary somewhat in tread profile, tread width and cross-sectional dimensions but still conform generally to the published design data and thus are interchangeable.

On the other hand, the tire casing of my invention departs to a considerable extent from the various dimensions of the so-called "standard" tire casing for any particular size. In addition, and what is more important, I utilize certain relationships between the dimensions of the tread width, tread profile and cross-sectional width to provide a new and improved tire casing having the advantages of easier riding and longer wear aforementioned. Moreover, the improved casing is interchangeable with existing tire casings when installed in sets and may use the same rim size. The effect of these particular relationships will now be pointed out together with the manner in which they are incorporated into my particular design of casing.

One of the features of my invention is the tread profile which is a close approach or the closest practical approach to a flat tread. Because the tread is flatter, it is possible to arrange the size and distribution of the tread elements so that under rated loading up to 13% more tread area is placed in contact with the road surface when compared with the tread area of the so-called "standard" tire casing. This increased amount of tread in contact with the road consequently results in increased mileage. Ordinarily, it is not practical to employ a relatively flat tread with conventional tire casings because of the resulting hard ride of the tire, and because of the heat problem. The flat tread forms relatively thick portions in the region of the tread shoulders of the tire, and these thick portions are objectionable because they restrict the dissipation of heat from adjacent areas of the tire. However, when the substantially flat tread is used in conjunction with other features of my invention, notably the increased cross-sectional width of the tire casing and a narrower tread width, both the hard ride and the heat problem are avoided and a far more economical use of a given amount of tread rubber is obtained.

Another feature of my invention is the relative proportion of the width of the tread, which is distinctively narrow as compared with conventional practices. The use of a relatively flat tread is permissible only in combination with a narrow tread because by narrowing the tread its thickness becomes substantially uniform throughout its width. As a result of this condition, relatively thick portions of rubber in the region of the tire shoulders are eliminated. The thick shoulder portions are objectionable in that, due to the internal friction and hysteresis of the rubber, the amount of heat generated is greater. This means that there are localized portions of a tire in which excessive heat is generated and which frequently result in tire failure. My invention overcomes these deficiencies by utilizing the combination of a relatively flat tread with a narrow tread. Because the extra bulk of rubber is removed in the shoulder regions, the tire of my invention actually runs from 10° to 15° cooler when operated in the critical speed range of from 70 to 80 M. P. H. in an ambient temperature of 95° to deliver more and safer mileage.

A further combination feature of my invention is an increased cross-sectional size of the tire as compared with conventional practices heretofore mentioned. It is recognized that tires having a large cross section have heretofore been used such as the well-known "balloon" tire already mentioned. However, in such cases it was found that the tires were objectionable because of definite limitations in tire performance. For example, large section balloon tires have been characterized by a definite reduction in the stability of the tire on the road; in addition, they exhibit increased tread wear. Although the tire of my invention is of increased cross section, it is still considerably less than that of a balloon tire; moreover, it overcomes the aforementioned defects by maintaining a definite relationship between the width of the tire section, the tread width, and the tread profile. This results in a tire which is exceptionally stable on the road and which exhibits excellent tread wearing qualities.

Another advantage of increasing the cross-sectional size is that a corresponding increase in internal volume is obtained. For example, a conventional tire designated 6.50–16 by the Tire & Rim Association has a total internal volume of about 1975 cubic inches. My improved tire of comparable size has a volume of approximately 2327 cubic inches, or an increase of about 17%. Due to this increase in volume, it is permissible to decrease the air pressure in the tire when operated at rated load. By using a larger casing section without an increase in rated loading capacity the result is less work per unit of carcass size or carcass area so that greater stability is achieved. Thus, by increasing the air volume by from 10 to 17 per cent, depending upon the size casing, with a corresponding reduction in the air pressure, the result is a smoother and more stable ride in which the tire acts to iron out road irregularities and reduce vibration.

With reference to the drawing, I show a pneumatic tire casing in cross section. The tire 1 is formed of rubberized layers of cord fabric forming the strain resisting plies of a carcass 2 which, in turn, is anchored to the usual bead members 3 and 4. Opposite side walls of the carcass 2 are covered with layers of rubber composition 5 and 6, and a tread portion 7 of rubber composition completes the tire assembly. Either natural or synthetic rubber may be used in manufacture.

In the drawing, the reference character A designates the maximum cross-sectional width of the tire casing measured from side wall to side wall when the casing is subjected to rated load and inflated to rated air pressure in the associated inner tube. The character B represents the maximum width of the tire tread under like conditions. The crown profile or transverse curvature of the tread on the road engaging surface is determined by a radius C, the center of which lies on the transaxial plane of the casing, as shown by the drawing.

As already indicated, some of the important features of my invention reside in the relationship of the dimensions identified as A, B and C. In the first place, in order to provide a softer, smoother and more stable ride, I increase the cross-sectional dimension A by from 3.5 to 6 per cent when compared to the corresponding dimension of a so-called "standard" tire of like rating listed by the Tire & Rim Association. This results in increasing the air volume of the casing by approximately 10 to 17 per cent. Instead of making a corresponding increase in the tread width, as has been heretofore practiced in building oversize tires, I decrease the tread width. In fact, I have found that the tread width should be decreased to an extent such that B is equal to from 55 to 65 per cent of A. This results in a coolor running tire with a consequent increase in tread life since the tread thickness is substantially the same throughout the tread width. At the same time, the tread is narrow enough so that the soft, stable ride attained by the increase in casing size is not impaired. Finally, I have given the tread a very flat crown, which closely approaches the profile of a flat tread, by increasing the length of the radius C. To this end, the dimension C is placed within a range of from 145 to 175 per cent of A. This means that the relatively flat tread results in a better distribution of tread pressures giving increased mileage when the tire is operated at rated load and air pressure. As already mentioned, the area of the tread in contact with the road is increased upon to 13% when compared with the contact area of the so-called "standard" tire giving a further improvement in tread wear. Inasmuch as the tread is narrow, the flat profile does not result in excess rubber being located in the tread shoulders so that internal heating of the casing is considerably reduced.

For the purpose of presenting in engineering form the distinguishing features of my invention and to make possible the easier practice of my invention in accordance with the provisions of the patent statutes, the dimensions of actual tires constructed in accordance with my invention are listed below. Also, for the purpose of comparison, similar dimensions are given for a conventional tire casing constructed substantially in accordance with specifications published by the Tire & Rim Association. In each case the tire casing is inflated to rated pressure, operated at equal load and mounted on the same recommended size rim.

6.00–16 CASING

|  | Conventional Tire | Improved Tire |
|---|---|---|
| Maximum Casing Width (Dimension A) inches | 6.25 | 6.55 |
| Tread Width (Dimension B) do | 4.39 | 3.98 |
| Crown Radius (Dimension C) do | 7.19 | 9.82 |
| Rated Air Pressure lbs | 23 | 26 |

6.50–16 CASING

|  | Conventional Tire | Improved Tire |
|---|---|---|
| Maximum Casing Width (Dimension A) inches | 6.80 | 7.15 |
| Tread Width (Dimension B) do | 4.78 | 4.30 |
| Crown Radius (Dimension C) do | 7.82 | 10.72 |
| Rated Air Pressure lbs | 28 | 26 |

7.00–15 CASING

|  | Conventional Tire | Improved Tire |
|---|---|---|
| Maximum Casing Width (Dimension A) inches | 7.35 | 7.62 |
| Tread Width (Dimension B) do | 5.16 | 4.68 |
| Crown Radius (Dimension C) do | 8.45 | 11.43 |
| Rated Air Pressure lbs | 26 | 24 |

Although I have indicated the actual dimensions of my improved casing for the three most popular size tires, it should be understood that the relationship and proportions between the dimensions A, B and C are the same for other sizes of casings now in general use for vehicles.

A tire casing constructed in accordance with my invention is one which provides a soft yet stable ride with easy steering qualities; at the same time increased tread wear is attained by increased road contact area and through a cooler running tire.

Having thus described my invention, what I claim and desire to protect by Letters Patent is:

A pneumatic tire casing comprising a carcass of plies and bead elements provided with a tread portion and side wall portions, the maximum cross-sectional width of the tire casing being from 3.5 to 6 per cent greater than the corresponding width of a standard tire of like rating as defined by the Tire & Rim Association to provide soft stable riding qualities, the width of the tread as measured from shoulder to shoulder tranversely of the tire being from 55 to 65% of the aforementioned cross-sectional width of the casing so as to provide a tread structure resistant to internal heat and one which does not impair the riding qualities of the casing, and the crown radius of the tread as measured along the transaxial plane of the tire being from 145 to 175% of the aforementioned cross-sectional width of the casing to provide a substantially flat tread giving increased wear.

ELLIOTT S. EWART.

REFERENCES CITED

The following references are of record in the file of this patent:

UNITED STATES PATENTS

| Number | Name | Date |
|---|---|---|
| 1,727,537 | Dearth | Sept. 10, 1929 |
| 1,827,668 | Musselman | Oct. 13, 1931 |
| 2,268,249 | Goodrich | Dec. 30, 1941 |
| 2,339,546 | Hanson | Jan. 18, 1944 |

FOREIGN PATENTS

| Number | Country | Date |
|---|---|---|
| 836,139 | France | Oct. 10, 1938 |